(12) United States Patent
Le (10) Patent No.: US 10,774,512 B2
(45) Date of Patent: Sep. 15, 2020

(54) SIPHON ACTIVATED VALVE

(71) Applicant: FLUIDMASTER, INC., San Juan Capistrano, CA (US)

(72) Inventor: Tuan Le, Fountain Valley, CA (US)

(73) Assignee: FLUIDMASTER, INC., San Juan Capistrano, CA (US)

(*) Notice: Subject to any disclaimer, the term of this patent is extended or adjusted under 35 U.S.C. 154(b) by 0 days.

(21) Appl. No.: 15/557,737

(22) PCT Filed: Mar. 14, 2016

(86) PCT No.: PCT/US2016/022352
§ 371 (c)(1),
(2) Date: Sep. 12, 2017

(87) PCT Pub. No.: WO2016/145442
PCT Pub. Date: Sep. 15, 2016

(65) Prior Publication Data
US 2018/0066421 A1 Mar. 8, 2018

Related U.S. Application Data (60) Provisional application No. 62/132,400, filed on Mar. 12, 2015.

(51) Int. Cl.
*E03D 1/32* (2006.01)
*F16K 31/126* (2006.01)
(Continued)

(52) U.S. Cl.
CPC ................. *E03D 1/32* (2013.01); *B67D 7/48* (2013.01); *E03D 1/20* (2013.01); *E03D 1/302* (2013.01);
(Continued)

(58) Field of Classification Search
CPC .. E03D 1/32; E03D 1/33; E03D 1/302; E03D 1/304; E03D 1/306
See application file for complete search history.

(56) References Cited

U.S. PATENT DOCUMENTS 2,875,778 A 3/1959 Hair
3,012,592 A 12/1961 Wright et al.
(Continued)

FOREIGN PATENT DOCUMENTS

CN 1248317 A 3/2000
CN 101956416 A 1/2011
(Continued)

OTHER PUBLICATIONS

U.S. Patent and Trademark Office; PCT International Search Report, Issued in Connection to PCT/US2016/022352; dated Jun. 6, 2016; 2 pages; U.S.
(Continued)

*Primary Examiner* — Janie M Loeppke
(74) *Attorney, Agent, or Firm* — Greenberg Traurig, LLP (57) ABSTRACT

A fill valve system with a float nested in a container connected to the fill valve and a siphon device passing water out of the container into the toilet tank, with the siphon device having an air vent dimensioned such that: (i) tank refilling is delayed until after the flush valve closes; (ii) the fill valve is not turned on by small leaks in the tank; and (iii) the fill valve turns off when it encounters large leaks in the tank.

18 Claims, 6 Drawing Sheets

(51) Int. Cl.
  *E03D 3/06* (2006.01)
  *E03D 5/02* (2006.01)
  *B67D 7/48* (2010.01)
  *F16K 31/365* (2006.01)
  *F16K 21/20* (2006.01)
  *F16K 1/12* (2006.01)
  *F16K 11/085* (2006.01)
  *E03D 1/30* (2006.01)
  *E03D 5/094* (2006.01)
  *F16K 7/12* (2006.01)
  *E03D 1/20* (2006.01)
  *E03C 1/02* (2006.01)

(52) U.S. Cl.
  CPC ............... *E03D 3/06* (2013.01); *E03D 5/024* (2013.01); *E03D 5/094* (2013.01); *F16K 1/12* (2013.01); *F16K 1/123* (2013.01); *F16K 7/12* (2013.01); *F16K 11/0856* (2013.01); *F16K 21/20* (2013.01); *F16K 31/1266* (2013.01); *F16K 31/1268* (2013.01); *F16K 31/365* (2013.01); *E03C 1/023* (2013.01); *E03C 2001/026* (2013.01)

(56) References Cited

U.S. PATENT DOCUMENTS

| | | |
|---|---|---|
| 3,381,604 A | 5/1968 | Bixby |
| 3,610,271 A | 10/1971 | Jarvis |
| 4,292,996 A | 10/1981 | Pataki et al. |
| 4,471,798 A | 9/1984 | Johannesen |
| 5,228,145 A | 7/1993 | Osmond |
| 5,623,961 A * | 4/1997 | Nichols-Roy ............ E03D 1/33 137/377 |
| 5,652,970 A | 8/1997 | Wodeslaysky |
| 5,661,855 A | 9/1997 | Osmond |
| 5,720,906 A | 2/1998 | Yamanaka |
| 5,836,346 A | 11/1998 | Nichols-Roy |
| 6,035,881 A | 3/2000 | Emmerich |
| 7,926,511 B1 * | 4/2011 | Schuster ................... E03D 1/32 137/434 |
| 9,340,960 B2 * | 5/2016 | Xu .......................... E03D 1/142 |
| 2003/0089422 A1 | 5/2003 | Bacchio |
| 2013/0068321 A1 * | 3/2013 | Guthrie ................... F16K 31/34 137/434 |
| 2013/0185859 A1 * | 7/2013 | Yu ............................. E03D 1/32 4/415 |
| 2014/0048157 A1 | 2/2014 | Fu |

FOREIGN PATENT DOCUMENTS

| | | |
|---|---|---|
| GB | 2271582 A | 4/1994 |
| WO | 2014207365 A1 | 12/2014 |
| WO | 2016145442 A1 | 9/2016 |

OTHER PUBLICATIONS

U.S. Patent and Trademark Office; PCT Written Opinion of the International Searching Authority, Issued in Connection to PCT/US2016/022352; dated Jun. 6, 2016; 6 pages; U.S.

China National Intellectual Property Administration, Search Report for Chinese Application No. 2016800251100, dated Oct. 26, 2018, 2 pages.

* cited by examiner

SIPHON ACTIVATED VALVE

RELATED APPLICATION

This application is the 35 U.S.C. § 371 national application of International Patent Application No. PCT/US2016/022352, filed Mar. 14, 2016, which designated the United States and claimed priority to provisional U.S. Provisional Application No. 62/132,400, filed on Mar. 12, 2015, and entitled "Improved Fill Valve," the disclosure of which are incorporated by reference in their entirety.

FIELD

This disclosure relates generally to valves for filling toilet tanks with water.

BACKGROUND

A disadvantage of existing fill valves is that they typically turn on (and start refilling the tank) at exactly the time when the water level first drops and the flush starts. The disadvantage with this approach is that the tank refilling starts while the flush valve is still open (and the water is still draining out of the tank). Although the flush valve closes quickly when the tank finally empties, all of the water supplied into the tank by the fill valve during the time when the flush valve is open is simply lost. It would instead be desirable to delay the start of the refilling until after the fill valve has fully closed. This would conserve water resources.

Unfortunately, current systems that try to delay the turning on of the fill valve until after the flush valve has closed have various disadvantages. For example, they tend to have too short a delay, or they have complex moving parts that can get fouled with hard water deposits and become ineffective over time. It would instead be desirable to provide a simpler refill delay solution that does not rely on complex mechanical linkages and moving parts.

Yet another problem common to existing fill valves is small leakage in the tank. Leaks can be small or large. A small leak in the tank will cause the water level in the tank to slowly drop. Unfortunately, this slight drop in water level immediately turns the fill valve on. Since only a partial re-filling is needed, the fill valve will then quickly shut itself off. Between flushes, the tank is almost completely filled. As a result of the tank being ostensibly filled, a user may not be able to recognize that the flush valve is leaking. A leaky flush valve that goes unrepaired will waste water which is of particular concern in an age when water has become increasingly scarce and expensive. To save water, and to reduce fill valve operation times, it would instead be desirable to permit small leaks without having to turn on the filling valve.

Conversely, large leaks are also a problem. Large leaks can be caused by a stuck (open) flush valve or by a cracked tank. When the refill rate of the fill valve is less than the leak rate from the tank, the fill valve will remain on, but the water will simply drain down into the toilet bowl, with the tank never re-filling. This situation can waste a huge volume of water, and cause a homeowner to suffer considerable expense. Current systems do not effectively deal with this problem at all. Therefore, there is a need for a fill valve that turns itself off when a large leak in the tank occurs.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect, the present system provides a fill valve system with a float nested in a container connected to the fill valve, and a siphon device which may optionally be a siphon tube or similar structure passing out of the container into the toilet tank such that: (i) tank refilling is delayed until after the flush valve closes; (ii) the fill valve is not turned on by small leaks in the tank; and (iii) the fill valve turns off when it encounters large leaks in the tank. In some embodiments, the siphon device is a siphon tube with the top bend of the siphon tube having a vent hole therein. In other embodiments, the siphon device is a conical structure. Other siphon devices and structures are contemplated, all keeping within the scope of the present invention. For example, any suitable tube within a tube structure can replace the illustrated conical structure.

In one preferred embodiment, the present system provides a fill valve, comprising: (a) a hollow water supply member; (b) a fill valve in fluid communication with the hollow water supply member; and (c) a float assembly connected to the fill valve, the float assembly comprising: (i) a container, (ii) a float nested in the container, wherein the position of the float in the container turns the fill valve on and off, and (iii) a siphon tube having an upper end in the container and a bottom end below the container. In another embodiment, the siphon tube is replaced by a conical siphon structure that drains the container. In further optional embodiments, the container has two compartments, with the float being in a first compartment, and refill water being directed into the second compartment (which then spills over into the first compartment). In such dual compartment embodiments, a separate siphon may be provided into each compartment to best adjust the timing of the valve under different flow rates and conditions.

Raising the float in the container turns the fill valve off, and lowering the float in the container turns the fill valve on. When the tank has fully refilled, the water in the tank will spill over the sides of the container, thereby starting to fill the container. As the container fills, the float will be lifted, thereby shutting off the fill valve. Conversely, as the water level in the tank drops, the siphon in the container will drain water out of the container, causing the float to fall, thereby turning off the fill valve. The container will be drained slower than the surrounding toilet tank. As a result, the float in the container will drop slower than a traditional float in the tank. Therefore, a delay mechanism will be created with the fill valve being turned on after the tank has fully or substantially drained. Preferably, this delay is long enough such that the fill valve will be turned on only after the flush valve has closed.

In the embodiments using a siphon tube, the siphon tube preferably has a vent hole at its top. The vent hole in the siphon tube is dimensioned to cause siphon flow when the water level in the tank is dropping at a rate greater than a pre-determined threshold, but the vent hole is also dimensioned to prevent siphon flow when the water level in the tank is dropping at a rate less than a pre-determined threshold. For example, the vent hole is small enough such that a normal flush (which drops water relatively quickly in the tank) will create a siphon flow pulling the water out of the container and into the tank. However, for a small leak, the water flow out of the tank will be small enough such that a siphon will not form in the siphon tube since the small amount of air entering the vent hole is sufficient to break the siphon flow. In various embodiments, the top and bottom ends of the siphon tube have different diameters so as to adjust to provide a desired suction force to pull the water out of the container and through the siphon.

The ratio between the diameters of the first and second ends of the siphon may be selected or adjusted to control a vacuum generated inside the siphon tube when water level in the toilet tank drops. Similarly, vacuum strength may be increased by increasing the ratio between the diameters of the first and second ends. The vent hole and the ratio between the diameters of the first and second ends may be designed so that a siphon flow is formed when the water level in the tank falls at or greater than a predetermined rate. Similarly, a siphon flow may not be formed when the water level in the tanks falls at a rate less than the predetermined rate.

In those embodiments of the system that use a conical siphon structure, the top and bottom ends of the structure can be similarly designed to optimize the amount of vacuum strength, as desired.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The features of the presently disclosed solution may be economically molded or assembled by using one or more distinct parts and associated components which, may be assembled together for removable or integral application with a known or to-be-designed toilet flushing systems in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

The disclosed solution can now be better understood turning to the following detailed description. It is to be expressly understood that the illustrated embodiments are set forth as examples and not by way of limitations on the embodiments as ultimately defined in the claims.

Referring first to FIGS. 1 to 4, the present fill valve system 110 comprises: (a) a water supply member 126; (b) a fill valve 111 at a top end of hollow water supply member 126; and (c) a float assembly 108 connected to the fill valve, float assembly 108 comprising: (i) a container 107, (ii) a float 105 nested in container 107, and (iii) a siphon tube 150 having an upper end 151 in container 107 and a bottom end 152 below the bottom of container 107. A vent hole 154 is provided at the top bend in siphon tube 150. In operation, the raising of float 105 in container 107 turns fill valve 111 off. Conversely, the lowering of float 105 in container 107 turns fill valve 111 on.

Water supply member 126 is preferably secured to a hole in the bottom of the toilet tank, and connected to the building's water lines. Fill valve 111 can be any suitable fill valve that is activated by the up or down movement of float 107.

Figure 1:
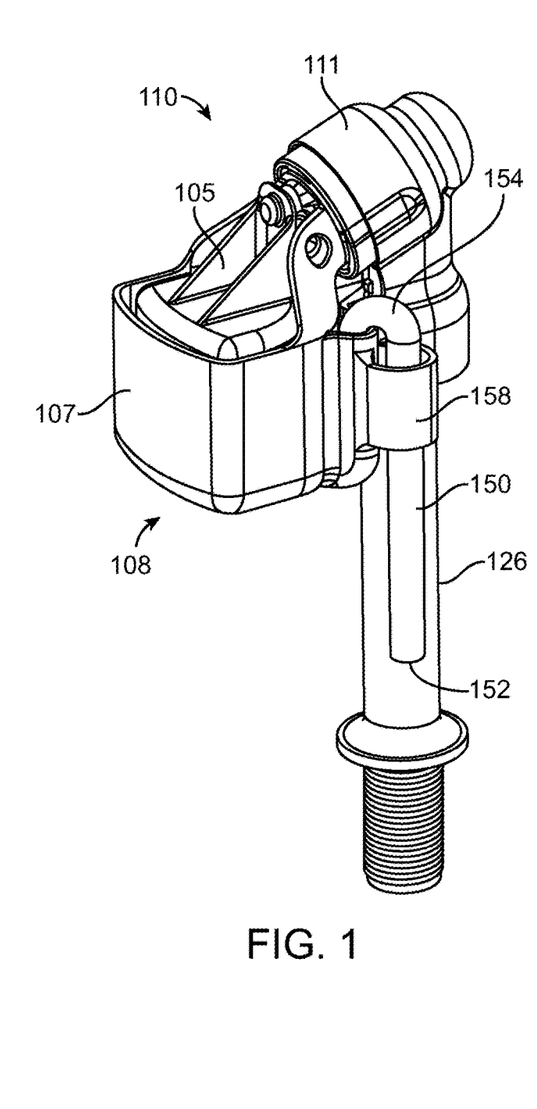
FIG. 1 is a perspective view of a first embodiment of a fill valve system with delayed filling and leak prevention features.
Figure 2:
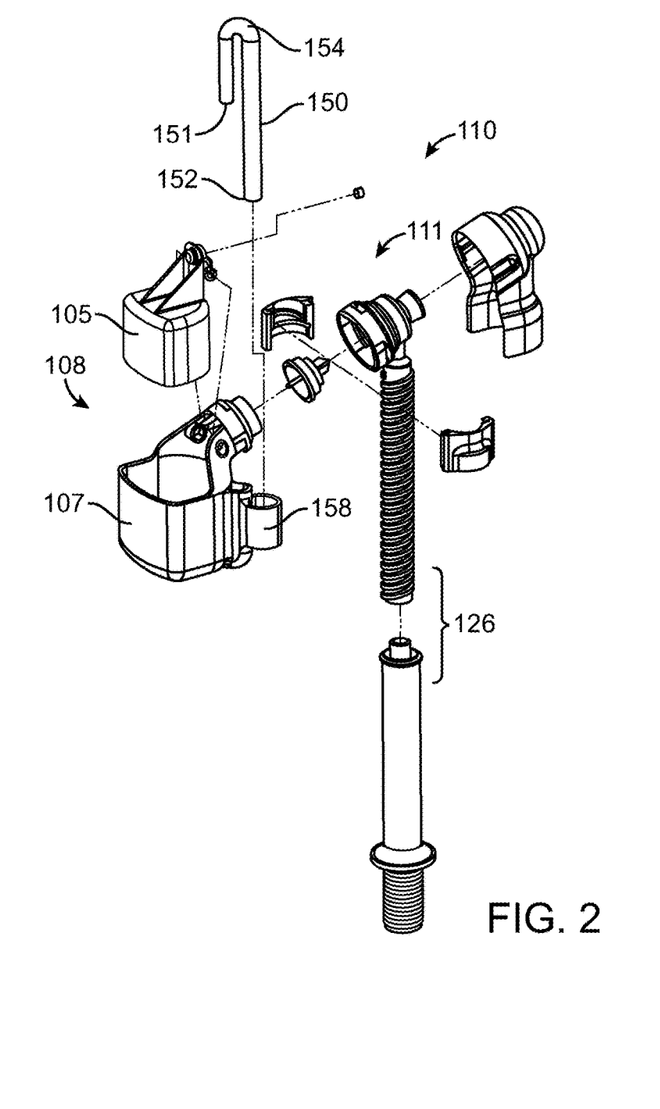
FIG. 2 is an exploded perspective view corresponding to FIG. 1.
Figure 3:
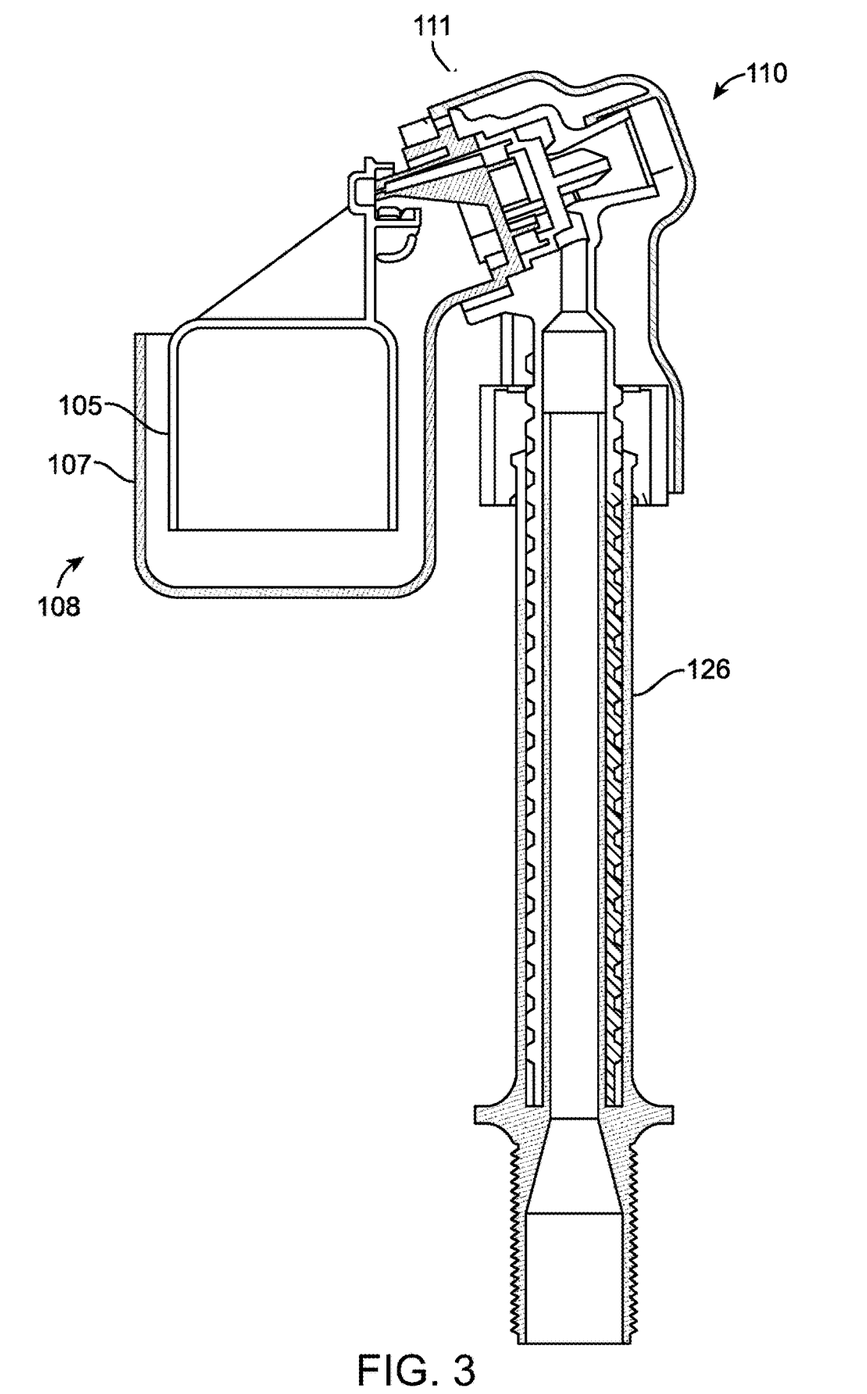
FIG. 3 is a sectional side elevation view corresponding to FIGS. 1 and 2, with the float in a raised position, shutting off the fill valve.
Figure 4:
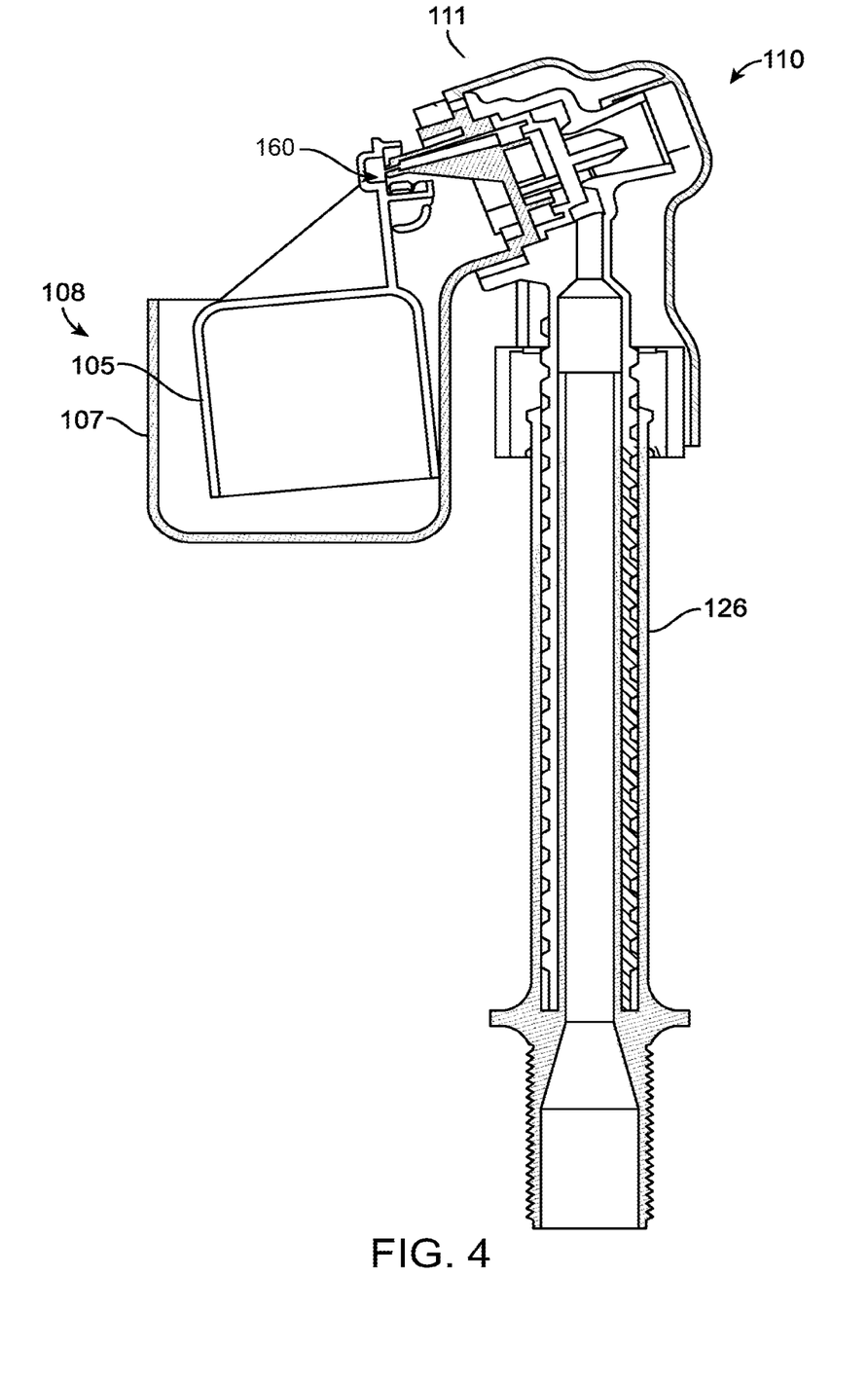
FIG. 4 is a sectional side elevation view corresponding to FIGS. 1 and 2, with the float in a lowered position, turning on the fill valve.
Figure 5:
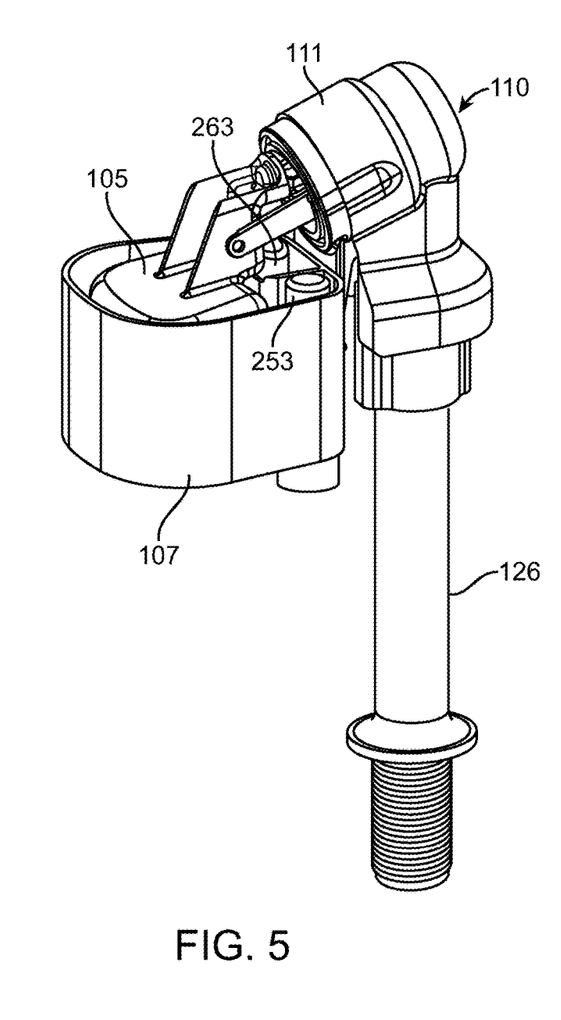
FIG. 5 is a perspective view of a second embodiment of a fill valve system with delayed filling and leak prevention features.

In preferred embodiments best seen in FIGS. 3 and 4, container 107 has an open top end into which tank water can spill, and float 107 has an open bottom end. When the tank is fully refilled (FIG. 3), the water will spill over the sides and into the open top end of container 108. At this time, float 105 will be lifted, shutting off fill valve 111. However, during a flush, water will rapidly leave the tank, and the water in container 107 will be siphoned out of container 107 (and into the surrounding tank) at a much slower rate. As a result, a novel delay mechanism is provided, with the activation of fill valve 111 being delayed until siphon tube 150 has drained container 107 such that float 105 will fall at a delayed time (and turn on fill valve 111 at a delayed time) as seen in FIG. 4.

As can be seen, the lower end 152 of siphon 150 is positioned below the upper end 151 of siphon 150 (which is positioned near the bottom interior of container 107). Therefore, a siphon flow will be created when the water level in the tank is lower than the water level in container 107. Siphon tube 150 may be attached to container 107 at a first end adjacent to or near the bottom of container 107 (see lower portion of mount 158 through which tube 150 passes into container 107). The other, lower end 152 of tube 150 functions as an outlet and is positioned below the container 107.

Prior approaches to activating fill valves with a delay (e.g.: until after the tank empties) have been attempted. Unfortunately, systems for delayed activation of fill valves have included valves with float delay mechanisms. These float delay mechanisms were designed to activate the corresponding fill valve a predetermined period of time after activation (e.g. a few seconds) to avoid the fill valve from activating and triggering a refill before the flush valve closes. Most of these prior solutions, however, fail to provide a sufficient delay to keep the fill valve closed until the flush valve is closed. These prior solutions also suffer from many moving parts which are known to wear down and fail over the course of use (i.e. hard water deposits).

In operation, the present vent hole 154 in siphon tube 150 is dimensioned to cause siphon flow when the water level in the tank is dropping at a rate greater than a pre-determined threshold. Conversely, vent hole 154 is also dimensioned to prevent siphon flow when the water level in the tank is dropping at a rate less than a pre-determined threshold. Specifically, for a slow leak, the water in the tank will fall very slowly, and vent hole 154 will be large enough to supply sufficient air into siphon tube 150 to break the siphon tube flow. As a result, container 107 will not be drained by siphon tube 150, thereby keeping float 105 afloat, and fill valve 111 shut off.

Optionally, the top and bottom ends of siphon tube 150 can have different diameters to best adjust the strength of the siphon formed in container 107. For example, siphon tube 150 may include a relatively small diameter at the tube end in communication with container 107. In contrast, a relatively larger diameter for outlet 152 may be utilized because the ratio of these two diameters can be selected, adjusted, and designed to control how vacuum will be generated inside tube 150 when the water level in the toilet tank drops at or greater than a predetermined rate. Once the predetermined rate is met or exceeded, a siphon action may be formed inside tube 150 causing water to be pumped from inside container 107 and into tank 4 through outlet 152.

If a stronger vacuum is desirous of being formed inside siphon tube 150, the ratio between the larger and smaller diameters of tube 150 can be increased or decreased as needed understanding that the larger ratio is directly related to stronger vacuum. The size of vent hole 154 and the ratio of the diameters of the tube 150 may be optimized to provide a strong enough siphon when there is a drop in water levels in the toilet tank at or greater than the predetermined rate due to a flush action. In turn, system 110 is designed so that no siphon is formed in tube 150 when the water level in the toilet tank drops at a rate slower than the predetermined rate since this typically happens during a leak. Accordingly, system 110 avoids activation and therefore refill unless the end-user specifically requests a flush cycle irrespective of how that flush cycle is requested (e.g. flush lever, button, touchless activation means, etc).

Existing systems have attempted to provide fill valve leak prevention mechanisms. Unfortunately, these systems were accompanied by complex linkage mechanisms to unlock or reset the mechanism for the valve to turn on at every flush cycle. Such solutions needed to be connected to one activation mechanism (e.g. a trip lever by a flexible linkage). Such systems therefore suffer from both having to be assembled during each flush cycle as well as using complex assembly that requires, for example, a predetermined tension so that the leak prevention mechanism can move during activation by the activation mechanism. This complicated assembly renders installation burdensome and unattractive for the end-user.

The present system also operates to shut off the fill valve in the event of a large leak (for example when the flush valve sticks in an open position). Should this situation occur, the toilet tank will drain continuously as the fill valve remains on, trying to re-fill the toilet tank. Traditional fill valve systems do not address this problem.

The present system addresses this problem as follows. As best seen by comparing FIG. 3 to FIG. 4, a small flow path 160 opens in FIG. 4 to provide a flow path from fill valve 111 into container 107. As the majority of water from fill valve 111 directly refills the tank (as shown by the flow arrows), a very small percentage of this refill water will be bled off into small flow path 160 and drip into container 107. As a result, container 107 will very slowly be filled with water from flow path 160 in the event that the flush valve remains stuck open. Such filling can optionally take an hour or so due to the very small size of the flow path 160. As can be appreciated, the amount of water flow diverted into container 108 by flow path 160 is very small compared to the amount of water that directly refills the tank. Thus, in normal operation, the tank will be refilled, and the float 105 will be lifted by tank water flowing over the top of container 108. However, in the event that there is a large leak, and the tank does not refill in a normal time period, the very small portion of water dripping or trickling through flow path 160 into container 108 will eventually fill container 108 such that the float 105 is lifted, thereby shutting off fill valve 111. This slow filling of container 107 may take an hour or so, but the toilet will only be running (and wasting fill water) for that one hour time period. As a result, a novel shutoff system in the event of large tank leaks is provided.

System 110 achieves the above discussed advantages without complicated mechanism(s), set-up, specific activation methods, or even expensive machined brass parts.

Figure 6:
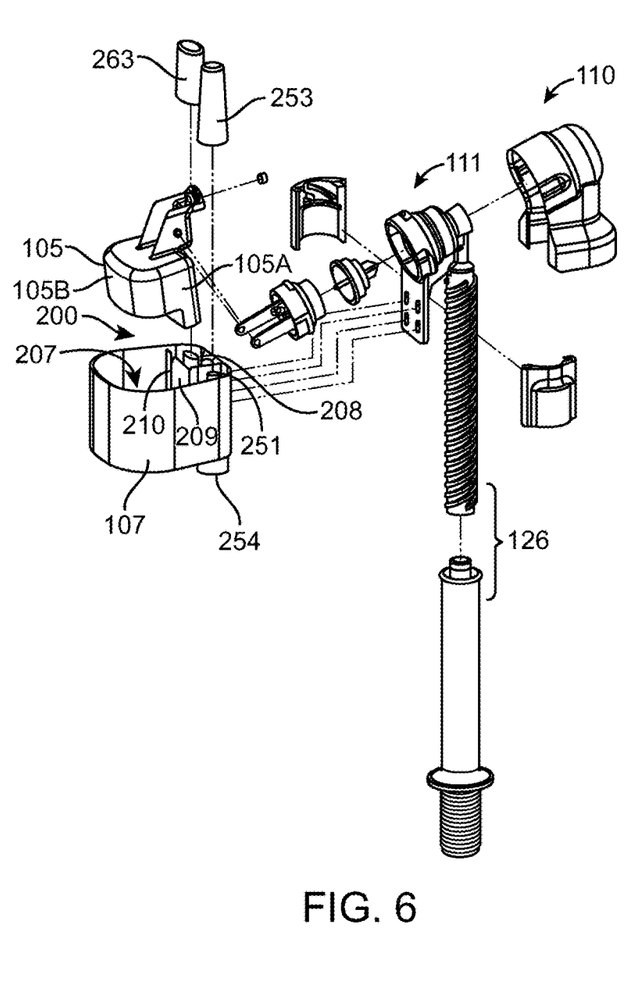
FIG. 6 is an exploded perspective view corresponding to FIG. 5.
Figure 7:
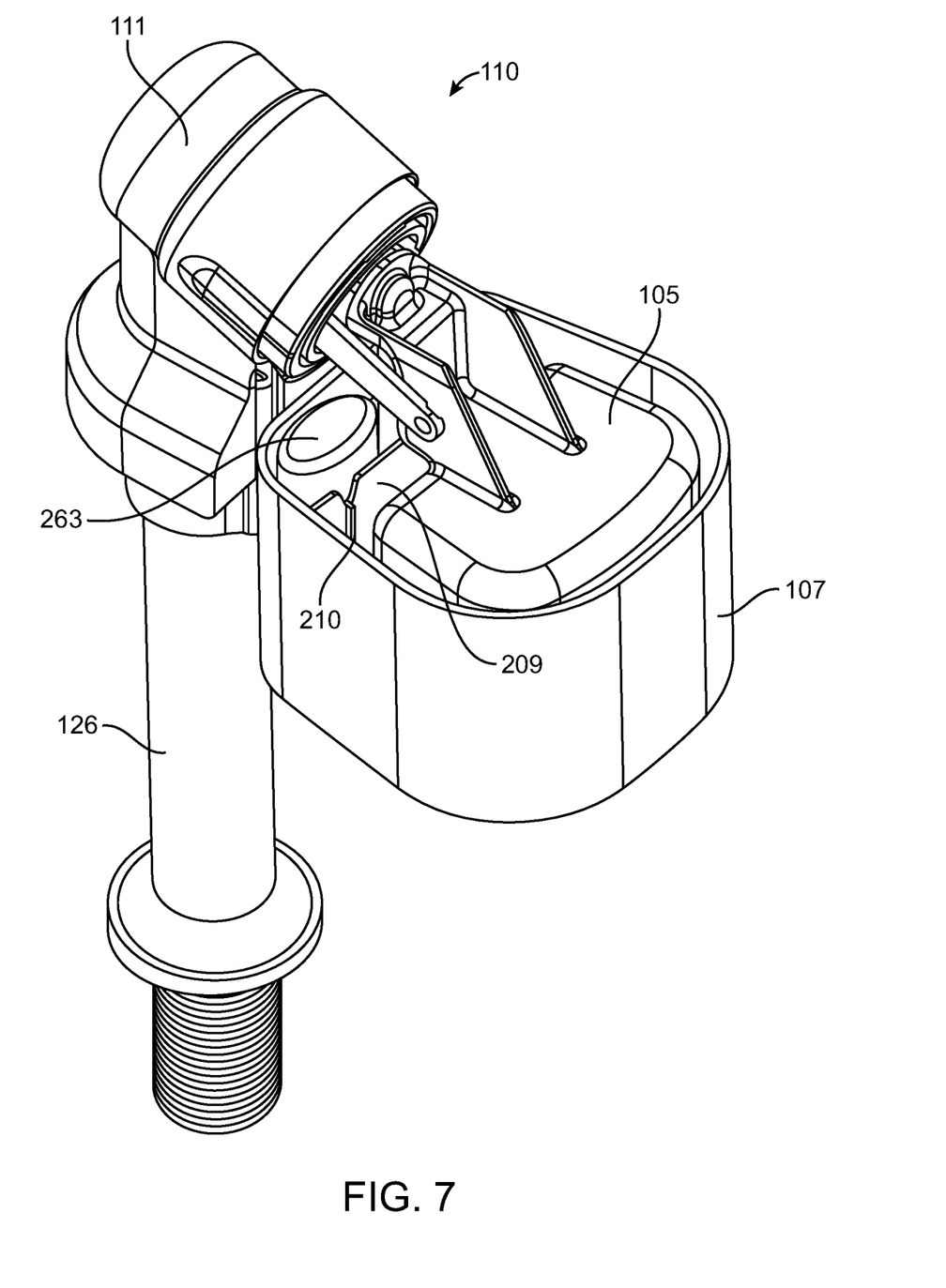
FIG. 7 is a top perspective view corresponding to FIGS. 5 and 6, with the float in a raised position, shutting off the fill valve.

FIGS. 5 to 9 illustrate a second embodiment of the invention where a siphon tube is instead replaced by a conical siphon structure in the container. (It is to be understood, however, that other siphon devices and structures are also contemplated here, all keeping within the scope of the present invention. In this embodiment, the siphon tube 150 is replaced by siphon system 200. As seen in FIG. 6, container 107 has a larger (first) internal compartment 207 and a small (second) internal compartment 208. Compartments 207 and 208 are separated by wall 209 having a notched weir 210. Compartment 208 is filled by refill water from path 106 and this water then spills over and refills compartment 207.

Figures 8, 9:
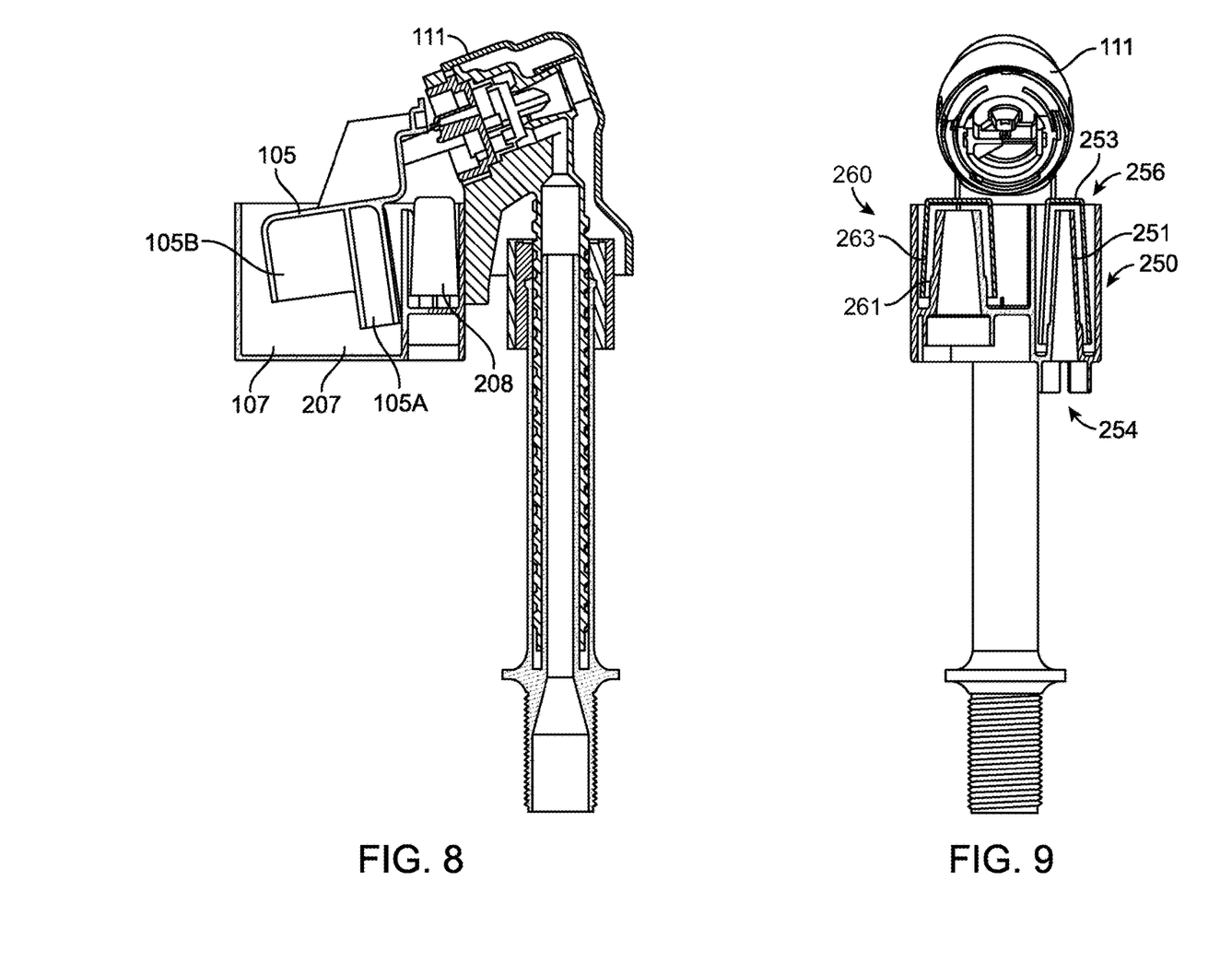
FIG. 8 is a sectional side elevation view corresponding to FIGS. 5, 6 and 7, with the float in a lowered position, turning on the fill valve.
FIG. 9 is a front sectional view corresponding to FIGS. 5, 6, 7 and 8.

The benefit of having two separate compartments 207 and 208 is that system timing can be optimized, as follows. Similar to the first embodiment of FIGS. 1 to 4, the fill valve 111 shuts off when float 107 is lifted, and the fill valve 111 turns on when float 107 falls. As best seen in FIG. 9, a siphon 250 drains container 207. Siphon 250 optionally comprises an upwardly facing cone 251 and a downwardly facing cone 253. Water passes between these two cones as it is siphoned out of compartment 207 of container 107 and falls down into the toilet tank through bottom orifice 254. As can also be seen, opening 256 provides a location where air can enter the top of the siphon structure 250. Thus, opening 256 operates similar to vent 154 in that it provides air sufficient to break the siphon flow in the case of a small leak.

However, in this embodiment, compartment 208 acts as a "metering" or "timing" guide for the system. Specifically, the rate at which the small portion of refill water (from path 160) refills compartment 207 can be adjusted. Therefore, the rate at which refill water from compartment 208 enters and fills compartment 207 can be adjusted.

Should a large leak occur, then water from fill valve 111 is directed into compartment 208. After compartment 208 refills, it then refills larger compartment 207. Over time, when the water fills small internal compartment 208, it will spill over weir 209 into larger compartment 207, filling container 107 and lifting float 105, thereby shutting off fill valve 111. It is desirable that second compartment 208 fill very slowly (since it is only functioning to shut off fill valve 111 if fill valve 111 has been running a long time, as in the case of a large leak). As such, a second siphon 260 may be present in small compartment 208 to ensure that it fills slowly. Second siphon 260 may comprise an upwardly facing cone 261 and a downwardly facing cone 263. Water passes between these two cones as it is siphoned out of second compartment 208 and falls down into the toilet tank below. Other siphoning structures are contemplated, all keeping within the scope of the present invention.

The benefit of having such a dual siphon structure is that first siphon 250 can be used to drain the container and lower the float, whereas the second siphon 260 will function as a mechanical timer that adjusts the time at which the container refills (for example, in the event of a large leak when tank water does not simply spill over into the container and lift the float). Instead, second siphon 260 ensures that the right amount of water is delivered to compartment 207 of container 107 and that it is delivered at the right time. As such, second siphon 260 ensures that the refill water (from path 160) fills container 107 at the desired time.

It is to be understood that the relative dimensions of the tops and bottoms, and the overall height of conical structures 251, 253, 261, and 263 can all be adjusted to optimize the strength of the relative siphon vacuums and the amount of time it will take the siphons 250 and 260 to drain their respective compartments.

In addition, FIGS. 6 and 8 disclose a novel float 105 having separate compartments 105A and 105B. Together, these two compartments prevent premature shut off as float 105 is lifted. Specifically, as water fills container 107, it will first reach the bottom of compartment 105A. As a result, the float 105 will be lifted, but it will also tend to rotate float 105 counterclockwise (in FIG. 8). This prevents fill valve 111 from turning on prematurely. Over time, as more water fills container 107, the water level will eventually reach the bottom of compartment 105B. As this time, float 105 will then rotate clockwise (since 105B is larger than 105A). At this time, rising float 105 will be in a position to turn off fill valve 111.

Many alterations and modifications may be made by those having ordinary skill in the art without departing from the spirit and scope of the embodiments disclosed and described herein. Therefore, it is understood that the illustrated and described embodiments have been set forth only for the purposes of examples and that they are not to be taken as limiting the embodiments as defined by the following claims. For example, notwithstanding the fact that the elements of a claim are set forth below in a certain combination, it must be expressly understood that the embodiments include other combinations of fewer, more or different elements, which are disclosed above even when not initially claimed in such combinations.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fill valve system, comprising:
   (a) a water supply member;
   (b) a fill valve fluidly coupled to the water supply member; and
   (c) a float assembly coupled to the fill valve, the float assembly comprising:
      (i) a container having a plurality of compartments, wherein the plurality of compartments in the container comprise first and second compartments, and wherein the fill valve system is configured and arranged for water from the fill valve to enter the first compartment, and
      (ii) a float nested in the second compartment, wherein based on a position of the float in the container, the fill valve is configured and arranged to be turned on and off, and
      (iii) at least one siphon device in fluid communication with at least one of the plurality of compartments in the container.

2. The fill valve system of claim 1, wherein the at least one siphon device comprises a siphon tube having an upper end in the container and a bottom end below the container.

3. The fill valve system of claim 1, wherein the at least one siphon device comprises a pair of nested conical structures positioned in the container.

4. The fill valve system of claim 1, wherein the float assembly further comprises:
   (i) an air vent into the at least one siphon device.

5. The fill valve system of claim 4, wherein the air vent into the at least one siphon device is dimensioned to cause siphon flow when the water level in a tank in which the fill valve is positioned is dropping at a rate greater than a pre-determined threshold.

6. The fill valve system of claim 4, wherein the air vent in the at least one siphon device is dimensioned to prevent siphon flow when the water level in a tank in which the fill valve is positioned is dropping at a rate less than a pre-determined threshold.

7. The fill valve system of claim 1, wherein raising the float in the container turns the fill valve off, and wherein lowering the float in the container turns the fill valve on.

8. The fill valve system of claim 1, wherein the container has a passage configured and arranged for tank water to spill through.

9. The fill valve system of claim 1, wherein top and bottom ends of the at least one siphon device have different diameters.

10. A method of operating a fill valve, comprising:
(a) providing a fill valve having a float assembly coupled thereto,
wherein the float assembly comprises an open-ended float nested in a container,
wherein the float assembly is configured and arranged so that the rotational position of the float in the container turns the fill valve on and off, and positioning the fill valve a toilet tank;
(b) draining tank water around the fill valve and float assembly;
(c) siphoning water out of the container to drain the container and thereby lower the float to turn on the fill valve;
(d) diverting a portion of refill water from the fill valve into the container such that the container refills and lifts the float thereby shutting off the fill valve in the event that the toilet tank does not refill;
(e) controlling the rate at which the portion of the refill water fills the container by providing a container with first and second compartments,
wherein the float is disposed in the first compartment, at least a portion of the refill water is directed into the second compartment of the container, and wherein the refill water entering the second compartment spills over into the first compartment; and
(f) siphoning water out of the second compartment to control the rate the water enters the first compartment and lifts the float.

11. The method of claim 10, wherein the lowering of the float within the container delays fill valve turn on.

12. The method of claim 10, further comprising:
(a) refilling the toilet tank with tank refill water from the fill valve;
(b) passing tank refill water into the container, and thereby lifting the float and shutting the fill valve off.

13. The method of claim 10, further comprising:
(g) allowing air to break the siphon such that the container does not drain when the water level in the tank is slowly decreasing.

14. A fill valve system, comprising:
(a) a water supply member;
(b) a fill valve in communication with the water supply member; and
(c) a float assembly coupled to the fill valve, the float assembly comprising:
(i) a container,
(ii) an open-ended float nested in a first compartment of the container, and configured and arranged to rotate to actuate the fill valve on and off,
wherein the float has a first float compartment and a second float compartment, and the first and second float compartments have open bottom ends at different heights such that the float rotates in a first direction when water covers the open bottom end of the first float compartment and wherein the float rotates in a second direction when water covers the open bottom end of the second float compartment, and
(iii) a fluid flow path in the fill valve to divert a portion of refill water into a second compartment of the container.

15. The fill valve system of claim 14, wherein based on a position of the float in the first compartment, the fill valve is configured to be turned on or off.

16. The fill valve system of claim 14, wherein a volume of fluid flow through the flow path is not manually adjustable by a user.

17. A fill valve system, comprising:
(a) a water supply member;
(b) a fill valve in fluid communication with the water supply member; and
(c) a float assembly coupled to the fill valve, the float assembly comprising
(i) a container having a plurality of compartments,
wherein the plurality of compartments in the container comprise comprises first and second compartments, and
wherein the fluid valve system is configured and arranged for water from the fill valve to at least partially fill the first compartment and spill into the second compartment;
(ii) a float nested in the second compartment of the container,
wherein based on a position of the float in the second container, the fill valve is configured and arranged to be turned on and off, and
(iii) at least one siphon device in fluid communication with at least the first compartment,
wherein the at least one siphon device is configured and arranged to control a rate at which water from the fill valve at least partially fills the first compartment.

18. The fill valve system of claim 17, wherein the at least one siphon device is configured and arranged to control a rate at which water from the fill valve spills into the second compartment.

* * * * *